Sept. 13, 1927. 1,642,531
T. V. BARNARD
POPPING KETTLE
Filed June 8, 1925
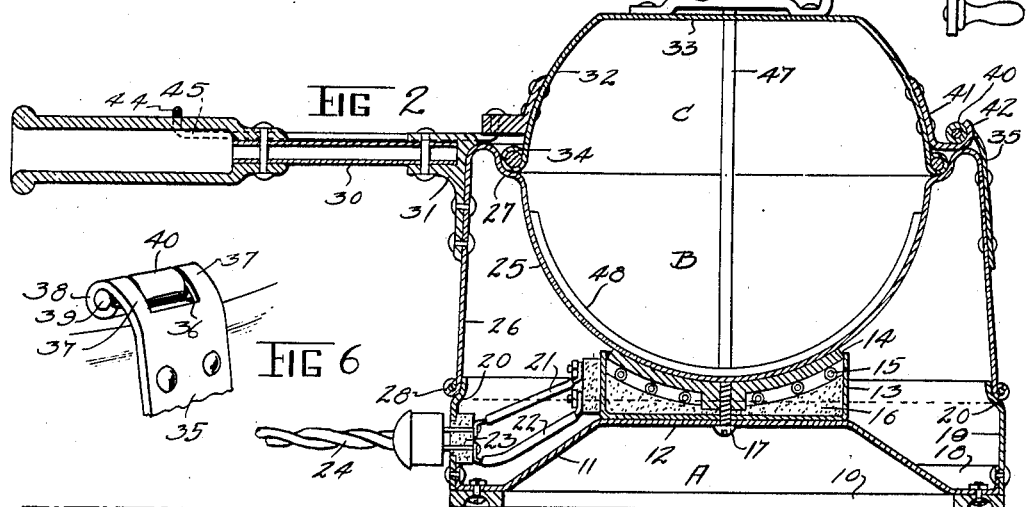
Inventor
Therides V. Barnard
By Bair Freeman & Latta Att'ys Patented Sept. 13, 1927.

UNITED STATES PATENT OFFICE.

THERIDES V. BARNARD, OF SCHALLER, IOWA.

POPPING KETTLE.

Application filed June 8, 1925. Serial No. 35,602.

My invention relates to a utensil adapted for popping corn, preserving fruits, cooking, and the like, and it is my object to provide such a utensil which is of novel, durable and inexpensive construction.

More particularly, it is my object to provide a three-part utensil of the class mentioned which comprises a flanged base having a heating element, a kettle adapted to register intimately with said element and having an encircling apron adapted to register with the flange of the base to enclose heating space under the kettle, and a cover having a novel releasable hinge connection with the kettle.

A further object is to provide a kettle of semi-spherical contour together with a hinged cover having a depending stirrer, the spherical contour of the kettle allowing hinging of the cover without interference between the stirrer and kettle.

A further object is to provide a kettle having an apron as above mentioned, which is formed integrally with the kettle, depending from the rim thereof, said rim having a depressed interior shoulder to receive the edge of the cover.

A further object is to provide a utensil which has a convenient and novel arrangement of handles for both kettle and cover, the cover handle being of simple and novel construction enabling it to fit over the kettle handle when the cover is closed.

The present invention is related to the inventions described in my co-pending application Serial No. 31002, filed May 18, 1925.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of the utensil.

Fig. 2 is a longitudinal vertical sectional view of the same.

Fig. 3 is a vertical transverse sectional view through a slightly modified form of kettle.

Fig. 4 is an elevation of a modified form of cover.

Fig. 5 is a vertical sectional view through a modified form of heater base, illustrating a portion of a kettle permanently attached thereto, and Fig. 6 is a detail perspective view of the hinge element carried by the kettle.

My invention contemplates generally the use of three units, a base and heater, which I will indicate generally by the reference character A, a kettle, B, and a cover C.

The base A has a base ring, 10, to which is secured an inverted pan-shaped plate, 11, having its central portion flattened as at 12 to receive the heating unit, 13. The heating unit, 13, has a spherically concave face plate, 14, under which are ordinary resistance elements, 15, supported upon a porcelain or other insulating bed, 16. A machine screw, 17, received through the flattened portion, 12, of the plate, 11, through the casing of the heater, 13, and threaded into the face plate, 14, serves to secure the heater in place.

The plate, 11, has a vertical annular flange, 18, to which is riveted the base flange, 19, extending upwardly from the plate, 11. At its upper end the flange, 19, is pressed inwardly to form a shoulder, 20.

21 and 22 are lead wires connecting the heater resistance elements with the contact plug, 23, by means of which the heater may be attached to any current-carrying medium, such as is shown at 24 in Fig. 2.

The kettle, B, is spun preferably of aluminum, and comprises the spherical bowl or kettle proper, 25, from the rim of which depends the encircling apron, 26, spaced at its rim from the kettle proper through the medium of a depressed shoulder, 27, within the rim. The lower edge of the apron, 26, is beaded, as at 28, and is of such diameter as to receive the upper reduced edge of the flange, 19, and to rest upon the shoulder, 20.

It will thus be seen that when the kettle, B, is placed upon the base, A, the space surrounding and below the bowl, 25, will be completely enclosed. When in such position the bottom of the bowl, 25, snugly rests within the hollow of the face plate, 14.

The bottom of the bowl, 25, might be flattened for use with a heater having a plane face, as shown in Fig. 3, at 29.

The kettle, B, is provided with a handle, 30, secured to the apron, 26, at its upper edge by means of a cast bracket, 31.

The cover, C, is made in the same manner and of the same material as the kettle, B, and comprises the spherical side portion, 32, the flattened pole portion, 33, and the beaded edge, 34. The bead, 34, is turned outwardly sufficiently to register with the shoulder, 27, and to allow the side portion, 32, to form a continuation of the curve of the bowl, 25. Thus the kettle may be used for basting.

Secured to the apron, 26, opposite the handle, 30, is a hinge loop, 35, formed of a plate of metal which extends above the rim of the kettle. The upper end of the metal plate is slotted as at 36 to form the bifurcations, 37, which are looped, as at 38, to receive a pin, 39. A sleeve, 40, is received on the pin, 39, between the bifurcations, 37.

A coacting hinge element, 41, is secured to the cover, C, and has at its end a hook, 42, curved through an arc of somewhat less than 180 degrees and positioned so that it may be hooked under the sleeve, 40, and through the slot, 36, so as to form a hinge connection with the loop, 35. In attaching or disengaging the cover from the kettle it must be swung to a position inverted to that shown in Fig. 2, and after it has been swung back through an arc of about 45 degrees toward the position shown, it will be firmly locked against removal from the kettle, the hook, 42, being engaged between the sleeve, 40, and the rim of the kettle.

When in closed position the hinge connection allows the rim, 34, to snugly seat against the shoulder, 27.

Opposite the hinge element, 41, a cast bracket, 43, is secured to the cover, 32. A handle for the cover, C, is formed of a length of heavy wire, arched at 44, to embrace the handle, 30, there bent laterally to form the two parallel arms, 45, the ends of which are swaged into the bracket, 43.

A stirring mechanism includes the bracket, 46, secured to the flattened pole, 33, and in which is supported a vertical shaft, 47, depending through the cover, C. To the lower end of the shaft, 47, is fixed a curved finger, 48, shaped to fit the bowl, 25. The upper end of the shaft is provided with a bevel pinion, 49, in mesh with a bevel gear, 50, on the handle shaft, 51, journalled in the bracket, 46. A crank handle, 52, serves to impart rotation to the stirring mechanism.

In Fig. 5 is shown a modified form of the kettle in which the heater supporting plate, 11, is secured to the apron, 26.

In Fig. 4 is shown a cover which may be used when the utensil is to be utilized as an ordinary cooking utensil. The hinge element, 41, may or may not be used with this form of cover, and the stirring mechanism is eliminated.

There are several advantages in the spherical kettle construction, among which are the smoother action attained in the stirring, the more complete mixing of the grains of corn, and a more even distribution of heat throughout the kettle. In addition, it is possible thus to use a stirring finger which covers the full width of the kettle and yet will not bind against the side of the kettle when the cover, to which it is affixed, is hinged about one side. This would not be true of a flat-bottomed kettle.

The apron and base structure serve to retain the heat within a closed chamber, and the heating is thus more economically effected and the heat is more evenly transmitted to the kettle. The temperature of the interior atmosphere of the kettle is more nearly that of the bottom which is directly subjected to the action of the heater than would otherwise be the case.

The arrangement of the two handles in registering positions adds very materially to the convenience of handling the device, the two handles occupying practically no more space than one alone. The hinge allows manipulation of the cover entirely with one hand, and yet the cover may be quickly removed entirely when desired.

The kettle may also be used without the heater, by placing it on the surface of a range or other stove, and is especially advantageous where it is not desired to have the bottom of the kettle contact directly with the heated surface of the stove. Here the apron serves to retain the heated air around the kettle in a mass of practically uniform temperature.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a stove having a base, an annular, externally shouldered, substantial vertical flange, and a central heating element supported on the base, a kettle having an annular apron extending downwardly from its rim and surrounding and spaced from the outer surface of the kettle, said apron at its lower edge being supported by said shouldered flange.

2. In combination with a stove having a base, an annular, externally shouldered, substantially vertical flange, and a central heating element supported on the base, a kettle having an annular apron extending downwardly from its rim and surrounding and spaced from the outer surface of the kettle, said apron at its lower edge being supported by said shouldered flange and the bottom of the kettle in engagement with the heating element.

3. In combination with a stove having a base, said base including a central raised portion and an annular, externally shouldered, substantially vertical flange, a central heating element supported on said raised portion, a kettle having an annular apron extending downwardly from its rim and surrounding and spaced from the outer surface of the kettle, said apron at its lower edge being supported by said shouldered flange and the bottom of the kettle in engagement with the heating element.

4. In combination with a stove having a base, an annular, externally-shouldered, substantially vertical flange and a central heating element supported on the base and having a concave spheroidal heating face, a kettle of semispherical form having an annular apron extending downwardly from its rim and surrounding and spaced from the outer surface of the kettle, said apron at its lower edge being adapted to be supported by said shouldered flange, and the bottom of the kettle to be received within the convex heating face.

Signed at Schaller, in the county of Sac and State of Iowa, this 1st day of June, 1925.

THERIDES V. BARNARD.